(12) United States Patent
Suzuki (10) Patent No.: US 6,791,663 B2
(45) Date of Patent: Sep. 14, 2004

(54) IMAGE FORMING APPARATUS (75) Inventor: Yasuo Suzuki, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/840,912

(22) Filed: Apr. 25, 2001

(65) Prior Publication Data

US 2002/0003614 A1 Jan. 10, 2002

(30) Foreign Application Priority Data

Apr. 26, 2000 (JP) ......................................... 2000-125342

(51) Int. Cl.[7] ........................ G03B 27/32; G03B 27/44; G03B 27/70
(52) U.S. Cl. ............................. 355/32; 355/46; 355/66
(58) Field of Search ............................. 355/32, 43, 45, 355/46, 49, 66, 67; 347/225, 231, 232, 233, 242, 245, 257, 258, 259, 260, 261, 262, 263; 399/298, 299, 110–113, 118

(56) References Cited

U.S. PATENT DOCUMENTS

| 4,598,323 | A | | 7/1986 | Honjo et al. ................. 358/285 |
|---|---|---|---|---|
| 4,675,745 | A | | 6/1987 | Suzuki ........................ 358/285 |
| 5,812,907 | A | | 9/1998 | Itoh et al. ...................... 399/87 |
| 5,953,042 | A | | 9/1999 | Nabeta et al. ............... 347/263 |
| 5,953,559 | A | * | 9/1999 | Obu ............................ 399/110 |
| 6,236,820 | B1 | * | 5/2001 | Nakazato et al. ........... 347/138 |
| 6,249,305 | B1 | * | 6/2001 | Miyamoto et al. .......... 347/118 |
| 6,381,428 | B1 | * | 4/2002 | Yamamoto et al. ......... 347/115 |
| 2001/0021319 | A1 | * | 9/2001 | Nakazato et al. ........... 399/111 |
| 2001/0031152 | A1 | * | 10/2001 | Kaneko et al. ............. 399/107 |

FOREIGN PATENT DOCUMENTS

| JP | 6-183056 | 7/1994 |
|---|---|---|
| JP | 10-186254 | 7/1998 |

* cited by examiner

Primary Examiner—Rodney Fuller
(74) Attorney, Agent, or Firm—Fitzpatrick, Cella, Harper & Scinto (57) ABSTRACT

An image forming apparatus for suppressing deviations in the application position of light emitted from an optical box, thus preventing an image from being deteriorated, has an image bearing body, a light source, a deflecting device for deflecting a light emitted from the light source, a lens for imaging a light deflected in this manner onto the image bearing body, and an optical box for containing at least the light source, the deflecting device, and the lens, wherein the optical box is provided plurally and the plurality of optical boxes are stacked to be integrated.

10 Claims, 9 Drawing Sheets

IMAGE FORMING APPARATUS

BACKGROUND OF THE INVENTION

1. Field of the Invention

The present invention relates to an image forming apparatus having a plurality of scanning type optical devices used in a copy machine, a printer, a facsimile, etc.

2. Related Background Art

Conventionally, in a scanning type optical device used in a laser beam printer (LBP), a digital copy machine, etc., light flux emitted from a light source means is light-modulated on the basis of an image signal and is periodically deflected by a deflector comprising, e.g., a rotary polygon mirror and then converged in a spot by a scanning type optical element (image forming element) having an fθ characteristic onto a surface of a recording medium (photosensitive drum) having a photosensitivity, which surface is scanned optically to record the image.

Figure 9:
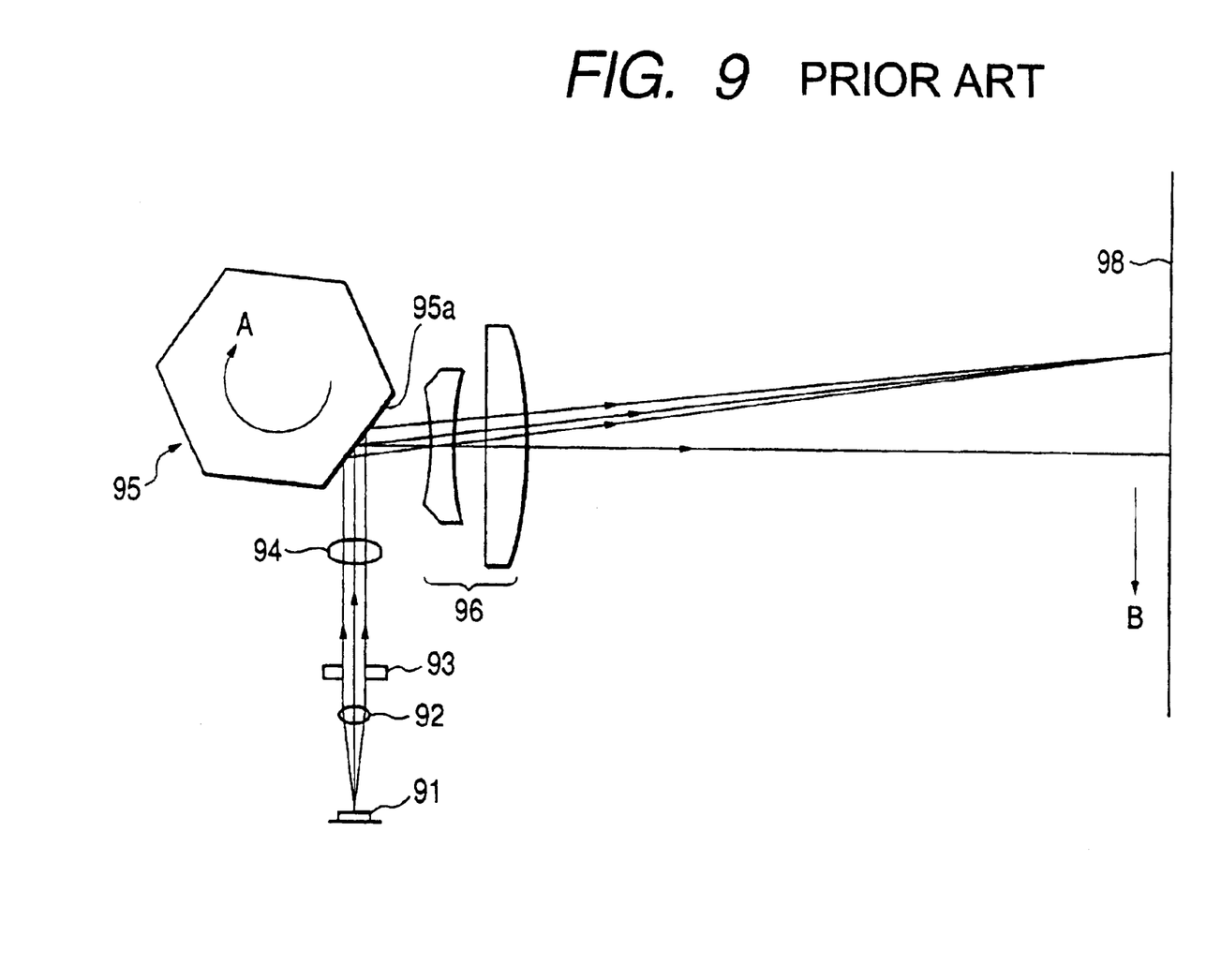
FIG. 9 is a plan view showing an important part of a conventional scanning type optical device.

FIG. 9 is a schematic diagram for showing an important part of the above-mentioned type of a conventional scanning type optical device.

In the scanning type optical device shown in FIG. 9, divergent light flux emitted from a light source means 91 is transformed by a collimator lens 92 into roughly parallel light flux, which is in turn limited in light quantity by a diaphragm 93 and then injected to a cylinder lens (cylindrical lens) 94 having a predetermined refracting power only in the sub-scanning direction. The roughly parallel light flux thus injected to the cylinder lens 94 is emitted as in a main scanning cross section, to be converged in a subscanning cross section and formed as an approximate line image on a reflecting surface 95a of a deflector 95 comprising a rotary polygon mirror.

Thus, the light deflected by (reflected from) the surface 95a of the deflector 95 passes through a scanning type optical element (fθ lens) having an fθ characteristic and is guided onto a photosensitive drum surface 98, which surface is then scanned optically in a direction of an arrow B when the deflector 95 is turned in a direction of an arrow A. In this way, an image is recorded on the photosensitive drum surface 98, which is a recording medium.

Recently, there has been proposed a color image forming apparatus having a plurality of (e.g., four) scanning type optical devices (see Japanese Patent Application Laid-Open Nos. 6-183056 and 10-186254).

A conventional color image forming apparatus, however, uses many folding mirrors and has a plurality of (e.g., four) scanning type optical devices independently screwed to a side plate of the main body thereof, so that when those optical devices are specifically fixed to that main body, their light application positions are deviated in different directions, thereby giving rise to misregistration in color, and thus causing image quality deterioration.

Furthermore, since they are solidly fixed in this manner, their light application positions are deviated in different directions by environmental fluctuations, i.e., high/low temperatures, distorted mounting (where the color image forming apparatus is mounted on a distorted surface), which also gives rise to misregistration in color.

SUMMARY OF THE INVENTION

It is an object of the present invention to provide an image forming apparatus for suppressing deviations in the application position of light emitted from an optical box, thus preventing an image from being deteriorated.

It is another object of the present invention to provide an image forming apparatus comprising an image bearing body, a light source, a polarizing means for polarizing light emitted from the light source, a lens for imaging light polarized by the polarizing means onto the image bearing body, and an optical box for containing at least the light source, the polarizing means, and the lens, wherein the optical box is provided plurally and the plurality of optical boxes to be integrated.

Further objects of the present invention will become apparent from the following description.

DESCRIPTION OF THE PREFERRED EMBODIMENTS

The following will describe some embodiments of the present invention with reference to the drawings attached hereto.

Figure 1:
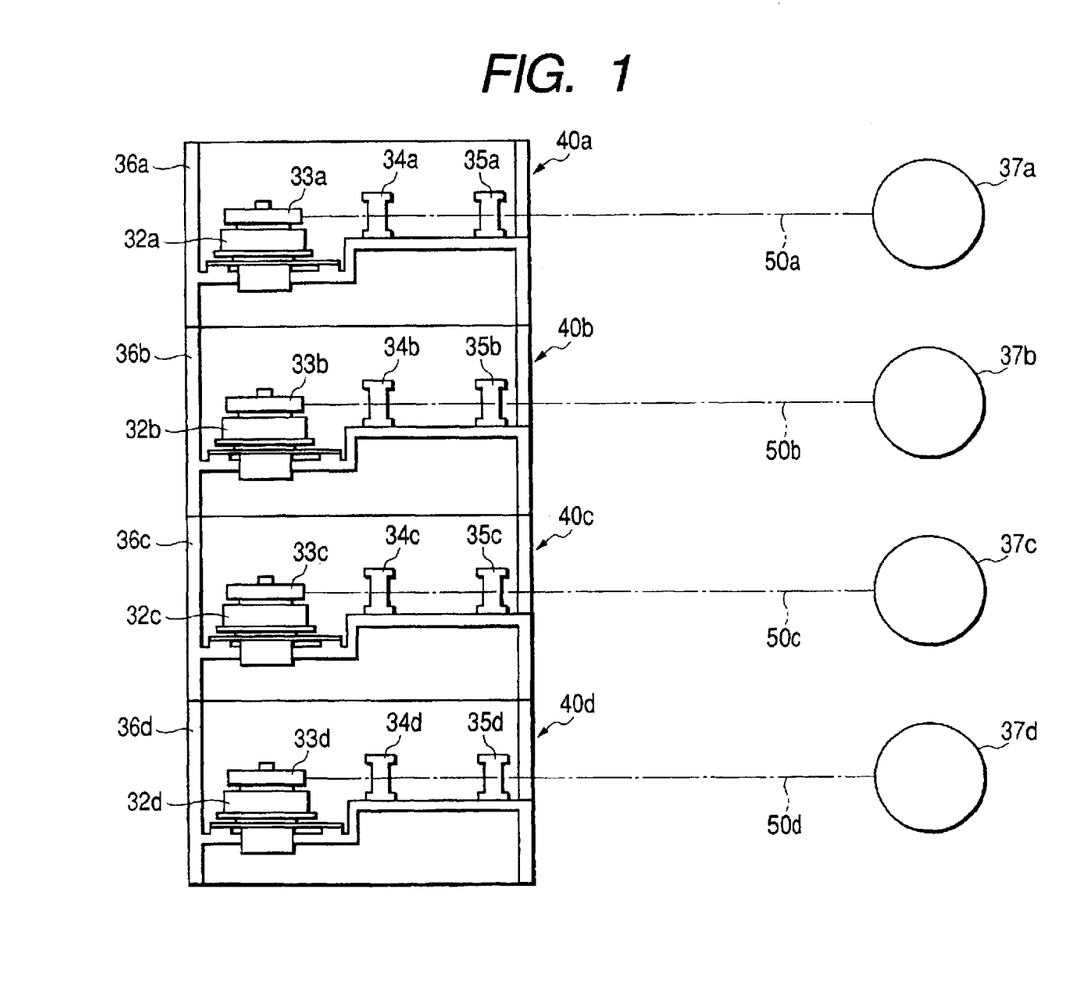
FIG. 1 is a cross-sectional view showing a state where scanning type optical devices of a color image forming apparatus related to the present invention are stacked in a plurality of stages.
Figure 2:
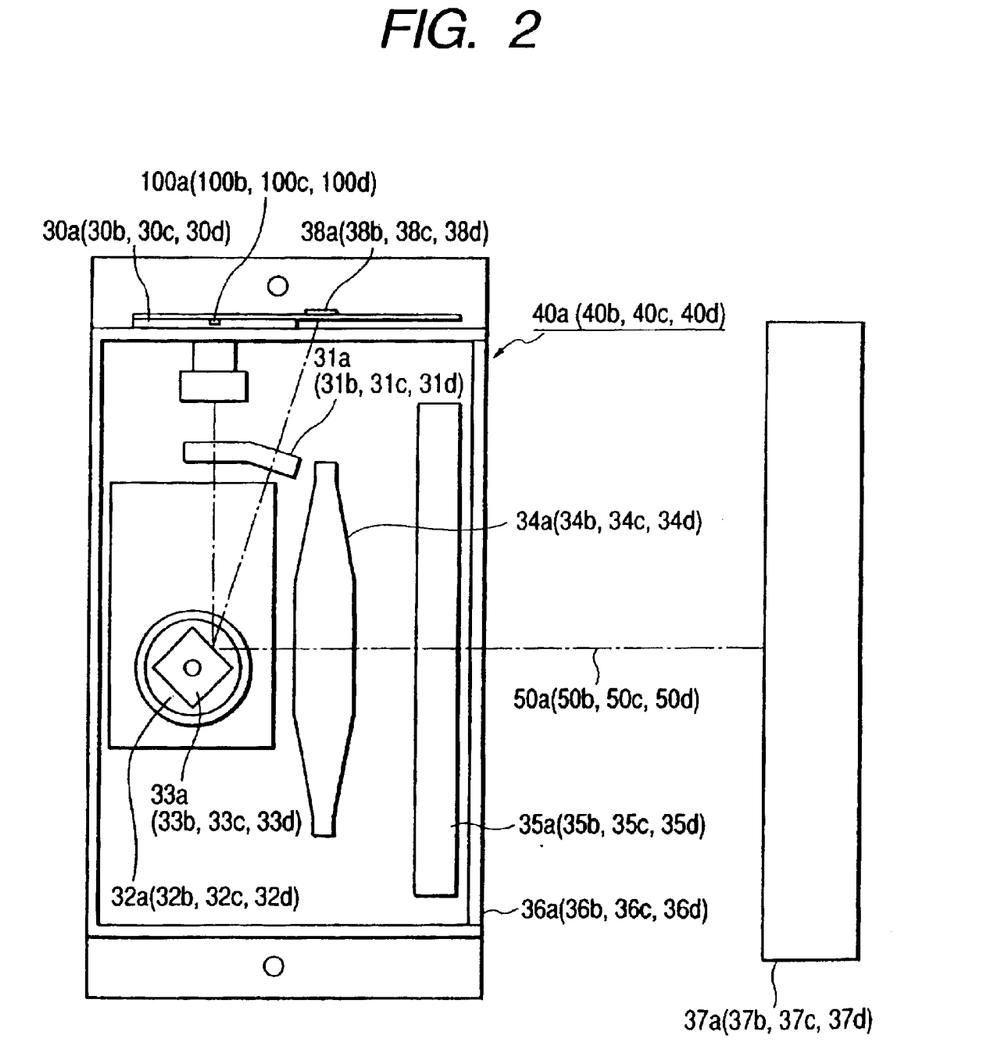
FIG. 2 is a plan view showing the scanning type optical device of the color image forming apparatus related to the present invention.
Figure 3:
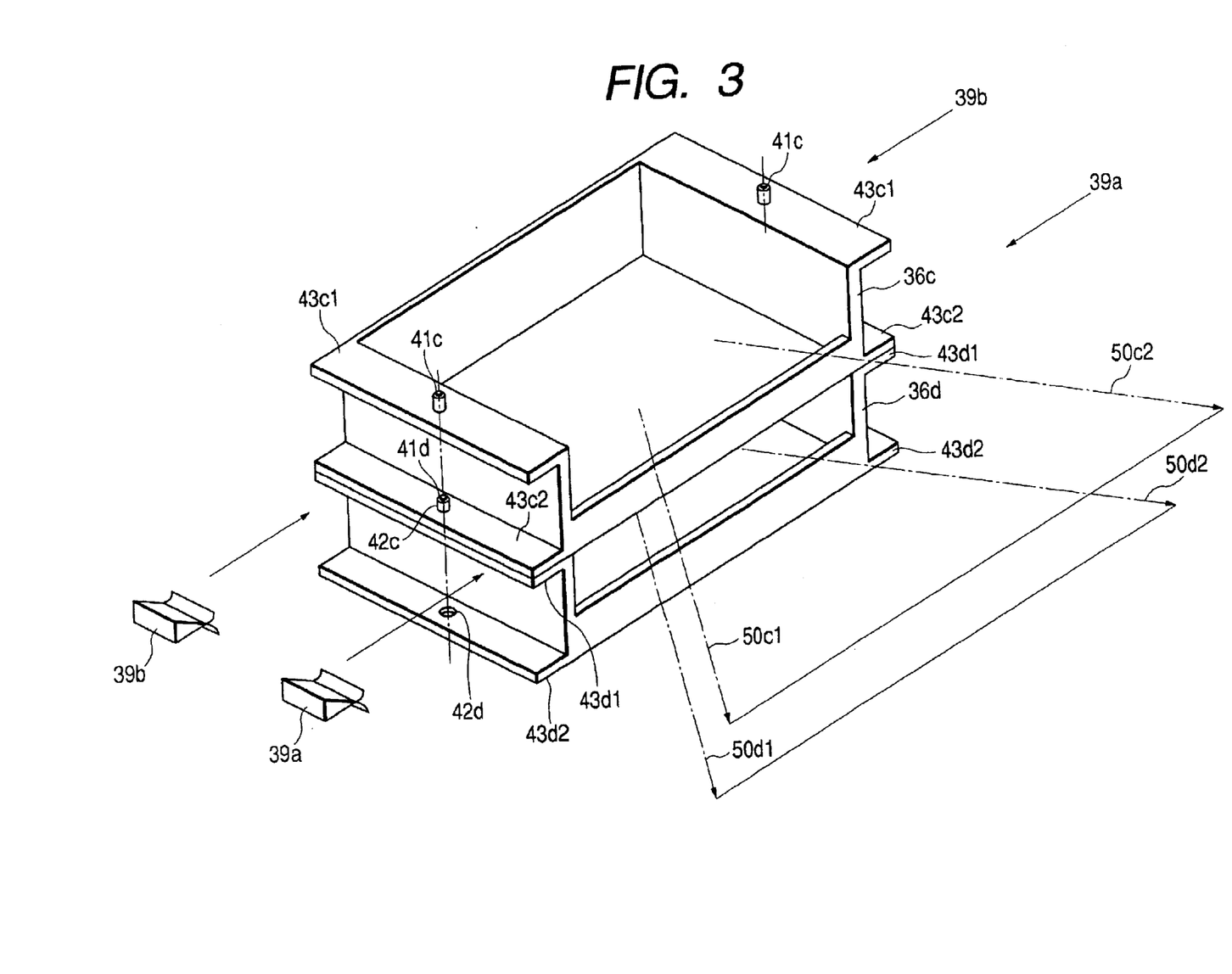
FIG. 3 is a perspective view showing an optical box of the scanning type optical device.

FIG. 1 is a cross-sectional view showing a state where scanning type optical devices of a color image forming apparatus related to the present invention are stacked in a plurality of stages, FIG. 2 is a plan view showing the scanning type optical device, and FIG. 3 is a perspective view showing an optical box.

In the color image forming apparatus relating to the present invention, as shown in FIG. 1, four scanning type optical devices 40a, 40b, 40c, and 40d are vertically stacked in a plurality of stages and respectively comprise optical boxes 36a, 36b, 36c, and 36d, which respectively include laser units 30a, 30b, 30c, and 30d for producing a roughly parallel light of a light flux emitted from light source semiconductor lasers 100a, 100b, 100c, and 100d, respectively, cylindrical lenses 31a, 31b, 31c, and 31d shown in FIG. 2 for forming as an image a light flux on the reflection surface of rotary polygon mirrors 33a, 33b, 33c, and 33d, respectively, deflector means 32a, 32b, 32c, and 32d for deflecting light flux 50a, 50b, 50c, and 50d, respectively for scanning, beam detecting sensors 38a, 38b, 38c, and 38d shown in FIG. 2 for sampling a write-out synchronization signal, image-forming lenses 34a, 34b, 34c, and 34d for forming as an image the thus-deflected light flux on image bearing bodies 37a, 37b, 37c, and 37d, respectively, and lenses 35a, 35b, 35c, and 35d.

In this embodiment, as shown in FIG. 3, at the upper part of the optical boxes 36c and 36d are provided with protrusions 41c and 41d, respectively and, at the lower part of them are formed pores 42c and 42d, respectively. The protrusion 41d and the pores 42c and 42d are provided on both sides of the optical box like the protrusion 41c.

Thus, the protrusion 41d of the underlying optical box 36d is fitted into the pore 42c of the overlying optical box 36c, thereby to align these two optical boxes 36c and 36d. Then, elastic member springs 39a and 39b are pushed from both sides into lateral ribs 43c2 and 43d1, which are expanded engaging portions for engagement with other optical boxes, of the optical boxes 36c and 36d, respectively, thereby to fasten these two optical boxes with each other.

The four scanning type optical devices 40a, 40b, 40c, and 40d can be fastened to one another by almost the same operations as above in such a configuration employed above that the optical boxes 36a through 36d are fastened to each other by use of the springs 39a and 39b, thereby to fasten those four optical boxes without deformations, unlike in the case of a conventional embodiment, thus avoiding fluctuations in the position of applying light flux 50a through 50d emitted from the scanning type optical devices 40a through 40d onto the image bearing bodies 37a through 37d, respectively. Moreover, even with environmental fluctuations such as high or low temperatures and skewed mounting, no residual stress is generated on the optical boxes 36a through 36d, so that such optical devices as the laser units 30a through 30d, the cylindrical lenses 31a through 31d, the deflectors 32a through 32d, and the image forming lenses 34a through 34d and 35a through 35d have no deformation or shift, with the result that the optical boxes 36a through 36d are not deformed or shifted, and so fluctuations in the light application positions do not occur.

Furthermore, those optical boxes can be fastened with each other by adhering them at the gap between the protrusion and the pore in place of using the spring. In addition, they can be fastened with each other by welding them at their respective protrusions.

Figure 4:
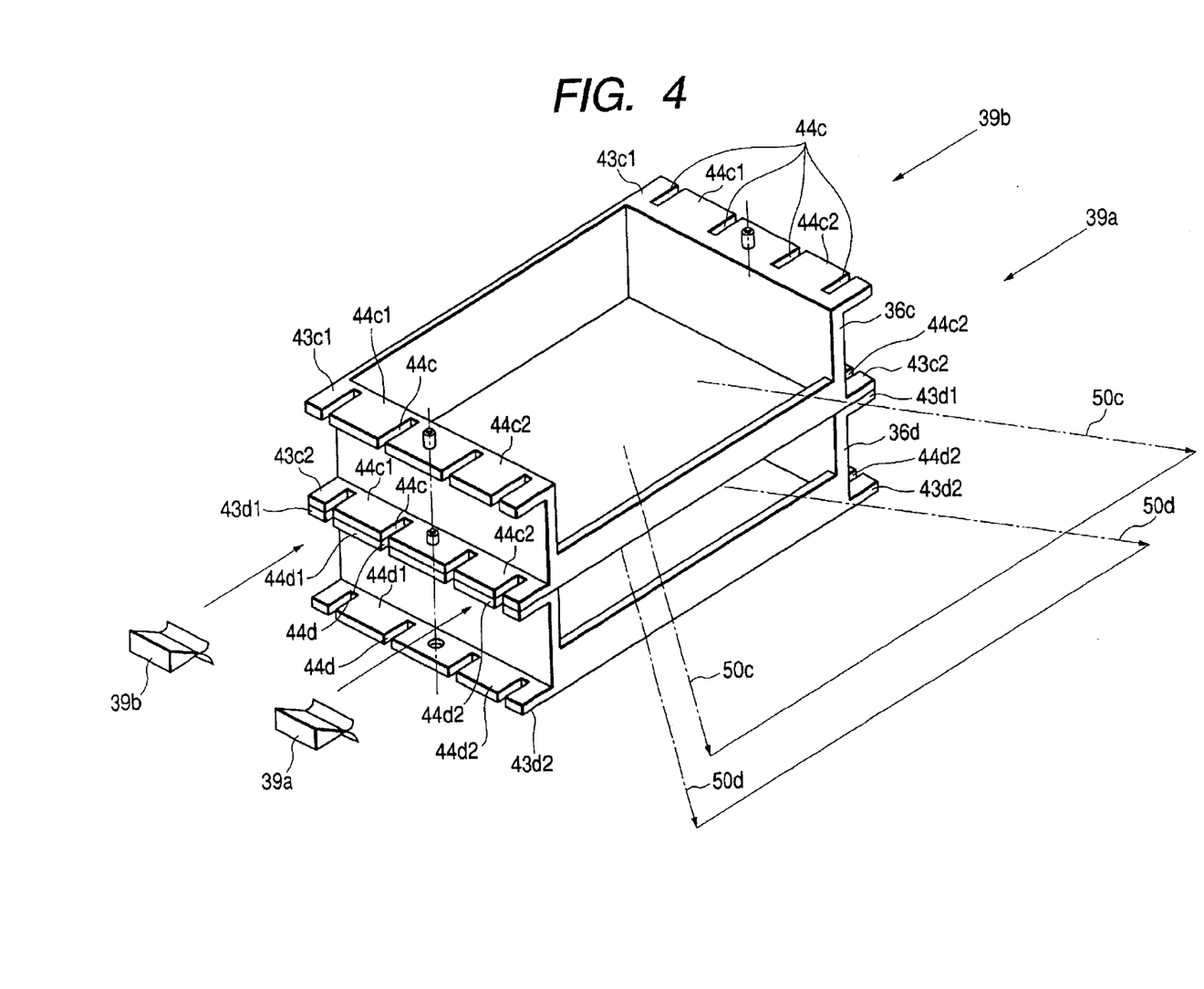
FIG. 4 is another perspective view showing the optical box of the scanning type optical device.

Furthermore, as shown in FIG. 4, the lateral ribs 43c1, 43c2, 43d1, and 43d2, at which the optical boxes 36c and 36d are fixed with each other, may be provided with notches 44c and 44d, respectively, to fasten the optical boxes 36c and 36d by sandwiching the ribs 44c 1 and 44c2 present between the notches of the lateral ribs 43c2 and 43d1 superposed one on the other using the springs 39a and 39b from both sides, thus avoiding deformations in the portions where such optical devices are mounted as the laser units 30c and 30d, the cylindrical lenses 31c and 31d, the deflectors 32c and 32d, and the image forming lenses 34c, 34d, 35c, and 35d, thereby to suppress fluctuations in the light application positions of the scanning type optical devices 40c and 40d. Accordingly, the optical boxes 36a through 36d can be fastened with each other by almost the same fastening method as above to thereby suppress fluctuations in the light application positions of the scanning type optical devices 40a through 40d.

In this case, if an inclination distance between the scanning type optical devices 40d and 40c when the scanning type optical device 40c is mounted to the scanning type optical device 40d is within an allowable range (a few tens of micrometers (μm) approximately), the scanning type optical devices 40c and 40d may be fastened to each other according to the above-mentioned method.

If, however, the light illumination is inclined such that the resultant misregistration in color goes out of the allowable range when the scanning type optical devices 40a through 40d are simply stacked one on another, the inclination can be adjusted according to the following procedure to then properly the scanning type optical devices 40a through 40d one another.

Figure 5:
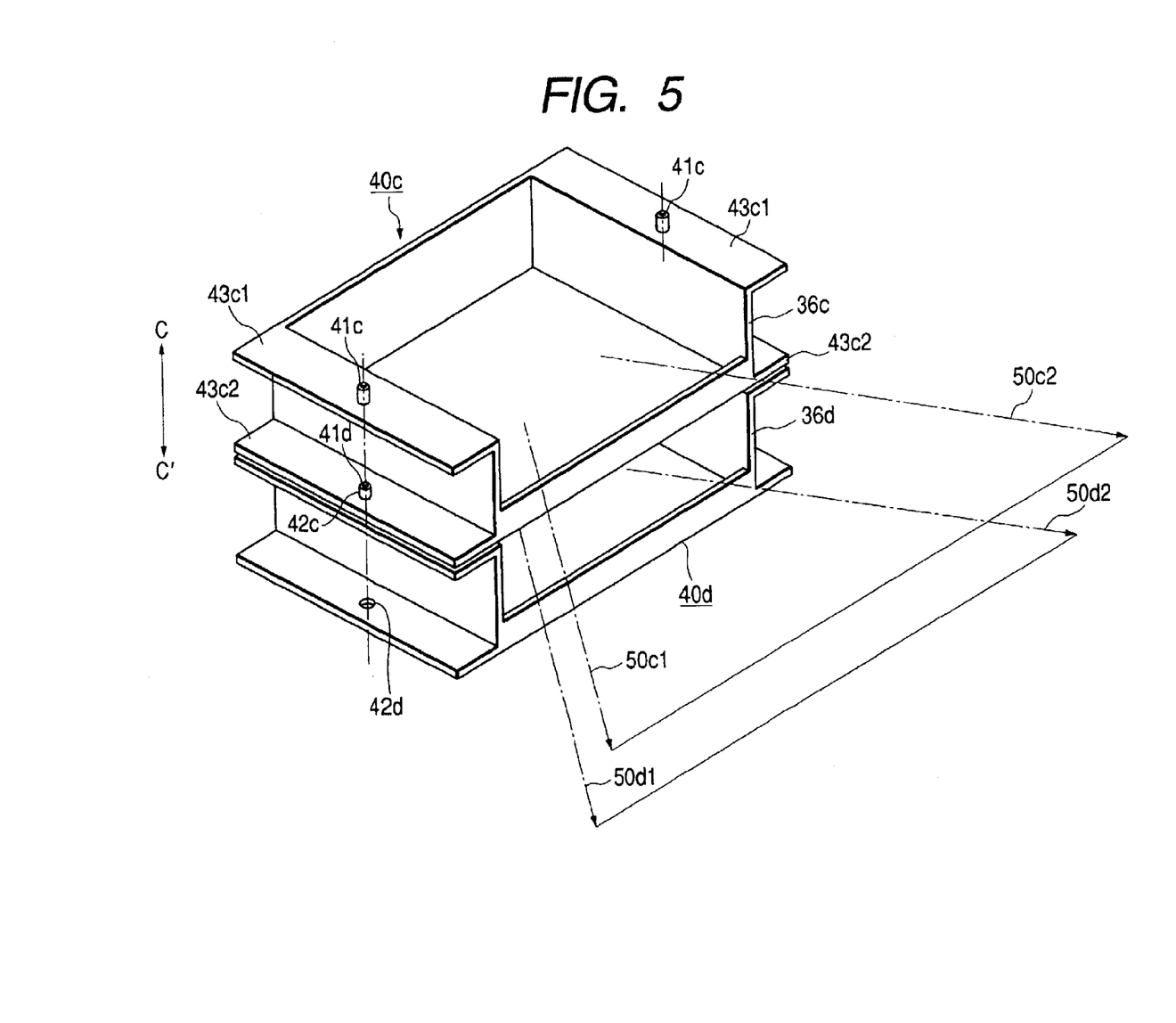
FIG. 5 is further another perspective view showing the optical box of the scanning type optical device.

By fixing, in FIG. 5, one side of the lateral rib 43c2 provided to the optical box 36c as measuring the light application positions (light flux 50c1 and 50c2) of the scanning type optical device 40c with respect to the light application positions (light flux 50d1 and 50d2) of the scanning type optical device 40d to then adjust the light application positions by moving the other side of the lateral rib 43c2 vertically in a C—C' direction in order to stop the optical box 36c at a predetermined position, an adhesive agent can be then poured into a gap between the protrusion 42c and the pore 42d, thereby to fix the optical boxes 36c and 36d to each other.

Figure 6:
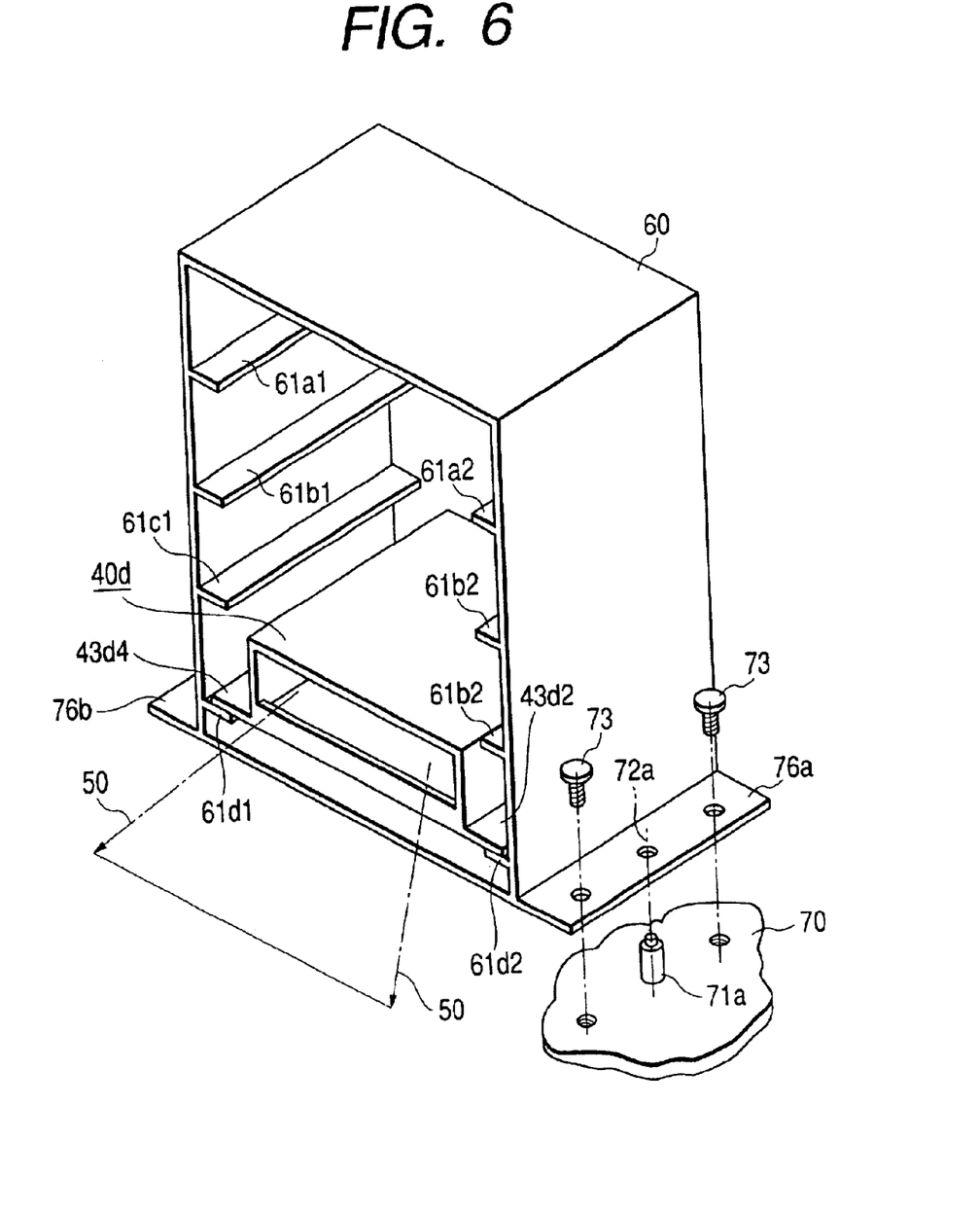
FIG. 6 is still further another perspective view showing the optical box of the scanning type optical device.

The following will describe a method for once fixing the scanning type optical devices 40a through 40d to their respective members with respect to FIG. 6.

A storage member 60, which is a positioning means, for the scanning type optical devices 40a through 40d is provided with inner ribs 61a1, 61a2, 61b1, 61b2, 61c1, 61c2, 61d1, and 61d2, so that when the scanning type optical device 40d is to be mounted for example, it is put on the inner ribs 61d1 and 61d2 to thereby sandwich, in a depth direction, a pair of the lateral rib 43d2 and the inner rib 61d2 and another pair of the lateral rib 43d4 and the inner rib 61d1 of the optical box 36d by using the springs 39a and 39b as shown in FIG. 3 or 4. Likewise, they are sandwiched by the springs 39a and 39b on the opposite side.

Likewise, the four scanning type optical devices 40a through 40d are mounted and fixed to the storage member 60.

In this case, the storage member 60 has one reference pore 72a (the other reference pore is formed on the opposite side) formed therein, so that by inserting into and fixing to this reference pore 72a one reference pin 71a (the other reference pin is provided on the opposite side) protruding from the color image forming apparatus 70, thereby to determine the position of the storage member 60, thus fixing it to the color image forming apparatus 70 by a screw 73. By providing such a storage member 60, the four scanning type optical devices 40a through 40d can be replaced simultaneously, thus facilitating maintenance. Moreover, even if the color image forming apparatus 70 is mounted on an inclined surface, only outer ribs 76a and 76b of the storage member 60 are deformed, thus leaving the light application positions of the scanning type optical devices 40a through 40d unchanged.

Figure 7:
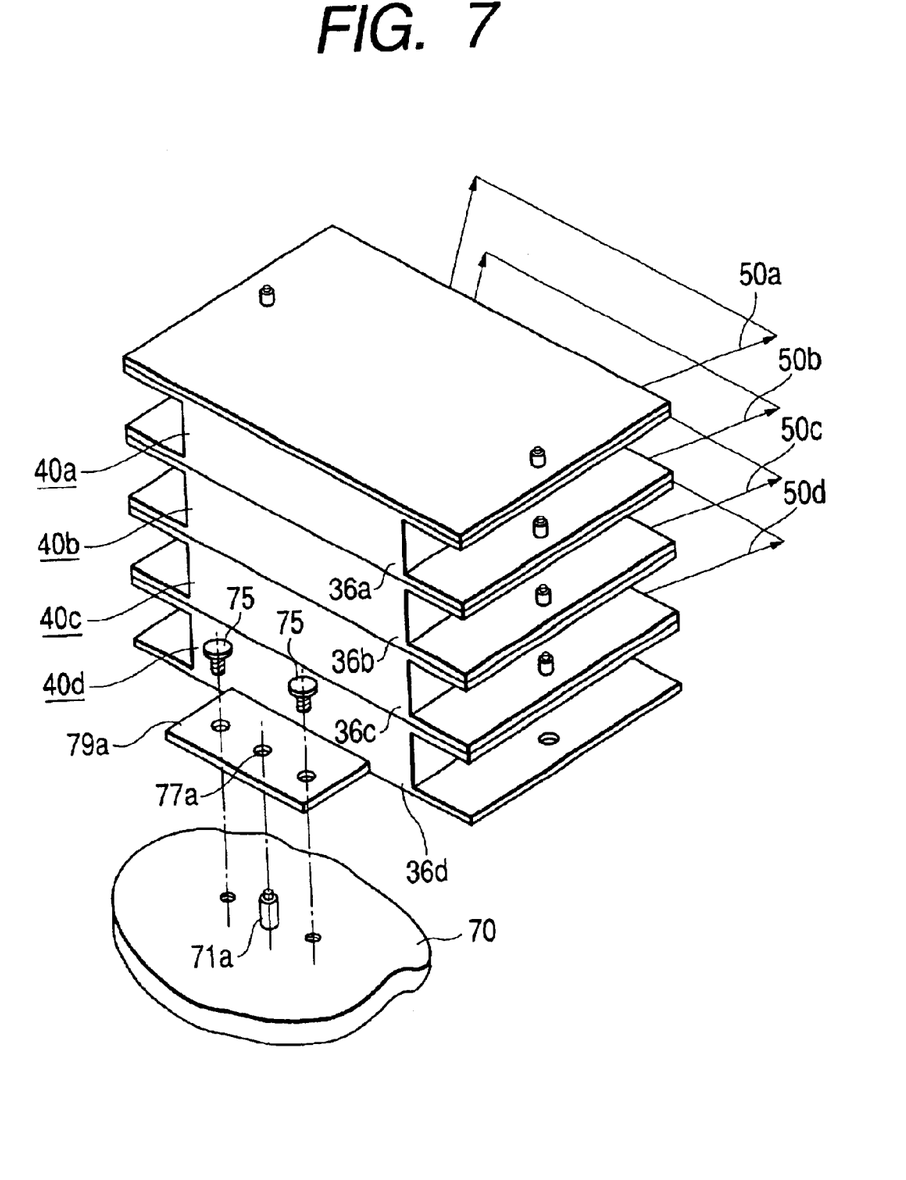
FIG. 7 is a perspective view showing a method of fixing the scanning type optical device to the color image forming apparatus.

The following will describe a method for stacking the scanning type optical devices 40a through 40d as they are one on another and then fixing them to the color image forming apparatus with reference to FIG. 7.

The optical box 36d of the scanning type optical device 40d set at the lowest stage is mounted with one engaging fixture rib 79a and the other at the front and rear parts thereof in the light emission direction, the fixture rib 79a of which has one reference pore 77a formed therein, with the other formed on the opposite side of the optical box.

Thus, the scanning type optical devices 40a through 40d are stacked one on another according to almost the same method as described above with reference to FIGS. 3, 4, or 5. Then, the reference pore 77a formed in the fixture rib 79a is fitted to the reference pin 71*a* (the other reference pin is provided on the light emitting side) provided as protruded on the color image forming apparatus 70, thereby to determine the positions of the scanning type optical devices 40*a* through 40*d*, thus fixing the scanning type optical devices 40*a* through 40*d* to the color image forming apparatus 70 using a screw 75. Thus, the scanning type optical devices 40*a* through 40*d* can be fixed to the color image forming apparatus 70 to thereby prevent the optical boxes 36*a* through 36*d* from being deformed, thus avoiding the fluctuations in the light application positions of the scanning type optical devices 40*a* through 40*d*.

Figure 8:
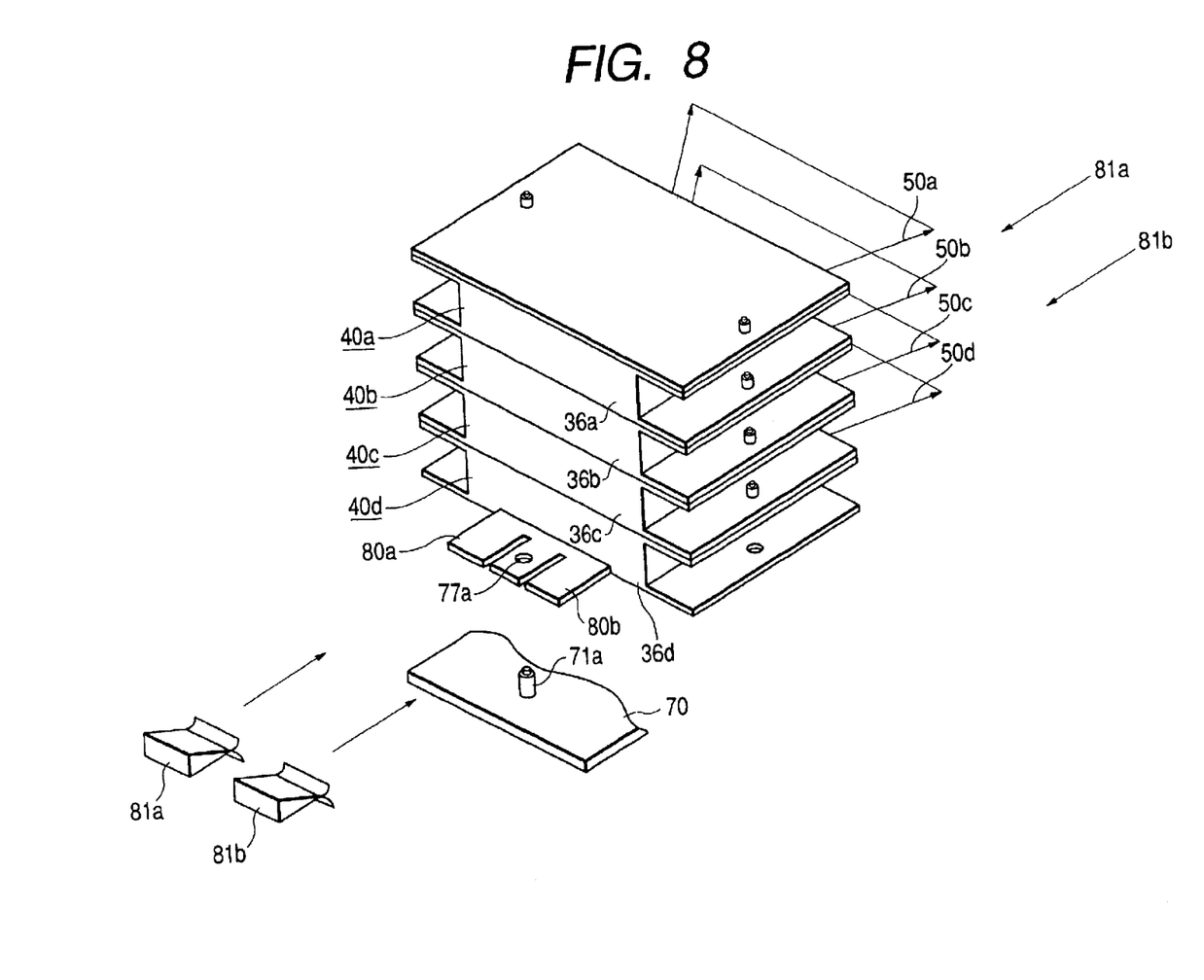
FIG. 8 is another perspective view showing the method for fixing the scanning type optical device to the color image forming apparatus.

Next, the following will describe a method for fixing the scanning type optical devices 40*a* through 40*d* using a screw, on the basis of FIG. 8.

Likewise in the above-mentioned example, the scanning type optical devices 40*a* through 40*d* are aligned and positioned through the reference pore 77*a* and the reference pin 71*a* and then fixed to the color image forming apparatus 70 by sandwiching this apparatus 70 and one pair of the ribs 80*a* and 80*b* (the other pair is provided on the opposite side) by one pair of fixture springs 81*a* and 81*b* (the other pair is provided on the opposite side). Accordingly, likewise in the above example, the optical boxes 36*a* through 36*d* are not deformed, to permit the scanning type optical devices 40*a* through 40*d* to be fixed as unchanged in light application position. In this case, the scanning type optical devices 40*a* through 40*d* can be fixed to the color image forming apparatus also by means of adhesion or welding to obtain the same effects.

In this embodiment in particular, in a case where the folded mirror is not arranged in the scanning type optical devices 40*a* through 40*d*, there are less factors present for causing fluctuations in the light application position even with a slight deformation in the optical boxes 36*a* through 36*d*, thereby to reduce those fluctuation in the light application position greatly, thus enabling obtaining a color image forming apparatus capable of high-accuracy printing.

Furthermore, in this embodiment, the interval (pitch) between the image bearing bodies 37*a* through 37*d* is the same as that between the scanning type optical devices 40*a* through 40*d*, so that the color image forming apparatus can be made with the minimum required number of components and very inexpensively.

Therefore, by the present invention, a plurality of optical boxes is put in a stack and integrated to thereby constitute scanning optical devices, so that these scanning type optical devices can be prevented from, when they are mounted to a color image forming apparatus, being deformed to be shifted in their light application positions in different directions, and thus image quality deterioration due to misregistration in color is avoided, and a high quality color image is obtained in a stable manner.

While there have been described what are at present considered to be preferred embodiments of the present invention, it will be understood that various modifications may be made therein, and it is intended to cover in the appended claims all such modifications as fall within the true spirit and scope of the present invention.

What is claimed is:

1. An image forming apparatus comprising:
    an image bearing member; and
    a plurality of optical boxes, each of said optical boxes containing at least:
        a light source;
        deflecting means for deflecting light emitted from said light source; and
        a lens, arranged to image light deflected by said deflecting means onto said image bearing member,
    wherein one of said plurality of optical boxes is stacked directly on and in contact with a second one of said plurality of optical boxes.

2. An image forming apparatus according to claim 1, wherein said one optical box has a positioning portion for receiving said second optical box to form a stack.

3. An image forming apparatus according to claim 1, wherein said one optical box and said second optical box are fixed to each other by an elastic member, or by adhering or welding.

4. An image forming apparatus according to claim 1, wherein said one optical box has an engaging portion for engaging with said second optical box.

5. An image forming apparatus according to claim 4, wherein said engaging portion has a notch portion.

6. An image forming apparatus according to claim 1, wherein said one optical box has an engaging portion for engaging with a main body of said apparatus.

7. An image forming apparatus according to claim 6, wherein said engaging portion has a notch portion.

8. An image foaming apparatus according to claim 1, comprising a plurality of image bearing members corresponding respectively to said plurality of optical boxes.

9. An image forming apparatus according to claim 8, wherein an interval between said one optical box and said second optical box is equal to an interval between two of said image bearing members.

10. An image forming apparatus according to claim 1, wherein said optical boxes correspond respectively to a plurality of images having different colors.

* * * * *

UNITED STATES PATENT AND TRADEMARK OFFICE
CERTIFICATE OF CORRECTION

PATENT NO. : 6,791,663 B2
APPLICATION NO. : 09/840912
DATED : September 14, 2004
INVENTOR(S) : Yasuo Suzuki It is certified that error appears in the above-identified patent and that said Letters Patent is hereby corrected as shown below:

COLUMN 4

Line 4, "on" should read --on top of--;
    Line 6, "erly" should read --erly stack--; "one" should read --one on top of--;
    Line 55, "on" should read --on top of--; and
    Line 65, "on" should read --on top of--.

COLUMN 5

Line 36, "fluctuation" should read --fluctuations--.

COLUMN 6

Line 40, "foaming" should read --forming--.

Signed and Sealed this

Third Day of June, 2008

JON W. DUDAS
*Director of the United States Patent and Trademark Office*